United States Patent [19]

Wolters, Jr. et al.

[11] Patent Number: 4,767,595
[45] Date of Patent: Aug. 30, 1988

[54] REPOSITIONED FUEL ASSEMBLY

[75] Inventors: Richard A. Wolters, Jr.; Mark J. Colby; Robert B. Elkins, all of San Jose, Calif.

[73] Assignee: General Electric Company, San Jose, Calif.

[21] Appl. No.: 49,897

[22] Filed: May 15, 1987

[51] Int. Cl.$^4$ .......................... G21C 15/00; G21C 7/00
[52] U.S. Cl. ................................. 376/353; 376/267; 376/352; 376/448
[58] Field of Search ............... 376/353, 352, 448, 444, 376/267

[56] References Cited

U.S. PATENT DOCUMENTS

| | | | |
|---|---|---|---|
| 2,994,657 | 8/1961 | Petrick | 376/352 |
| 3,101,309 | 8/1963 | Groh | 376/448 |
| 3,122,484 | 2/1964 | Iskenderian | 376/448 |
| 3,338,791 | 8/1967 | Lass et al. | 376/448 |
| 3,853,701 | 12/1974 | Sasaki et al. | 376/448 |
| 3,920,517 | 11/1975 | Sasaki et al. | 376/448 |
| 3,939,039 | 2/1976 | Seki et al. | 376/448 |
| 4,142,934 | 3/1979 | Wild | 376/448 |
| 4,448,744 | 5/1984 | Karger et al. | 376/448 |
| 4,448,745 | 5/1984 | Anthony | 376/448 |
| 4,560,532 | 12/1985 | Barry et al. | 376/444 |

FOREIGN PATENT DOCUMENTS 0148690 12/1978 Japan .................................. 376/352

Primary Examiner—Harvey E. Behrend
Attorney, Agent, or Firm—Robert R. Schroeder

[57] ABSTRACT

In a boiling water reactor (BWR) of the D-lattice type an improved apparatus and method for the mounting of a nuclear fuel assembly is disclosed. Specifically, a D-lattice nuclear fuel assembly is diagonally displaced at the top and diagonally displaced at the bottom to and toward the cruciform shaped control rod interstices. Displacement at the bottom end of the nuclear fuel assembly occurs by an eccentrically centered lower tie plate and fluid inlet for fitting to the core plate at the bottom end of the assembly. Displacement at the top end of the nuclear fuel assembly occurs by shims in the vicinity of the upper end of the channel at the top guides. The disclosed channel assembly is capable of installation during refueling cycles, with a displaced channel being substituted for prior art conventional D-lattice channels. Substitution of one displaced channel occurs with each refueling cycle in a group of four channels. Consequently, there results at the end a maximum of four refueling cycles, complete installation of the displaced channels. As substitution occurs, there results an improved worth of each fuel channel assembly enabling an eventual aggregate 2% increase in life with resultant savings.

3 Claims, 5 Drawing Sheets

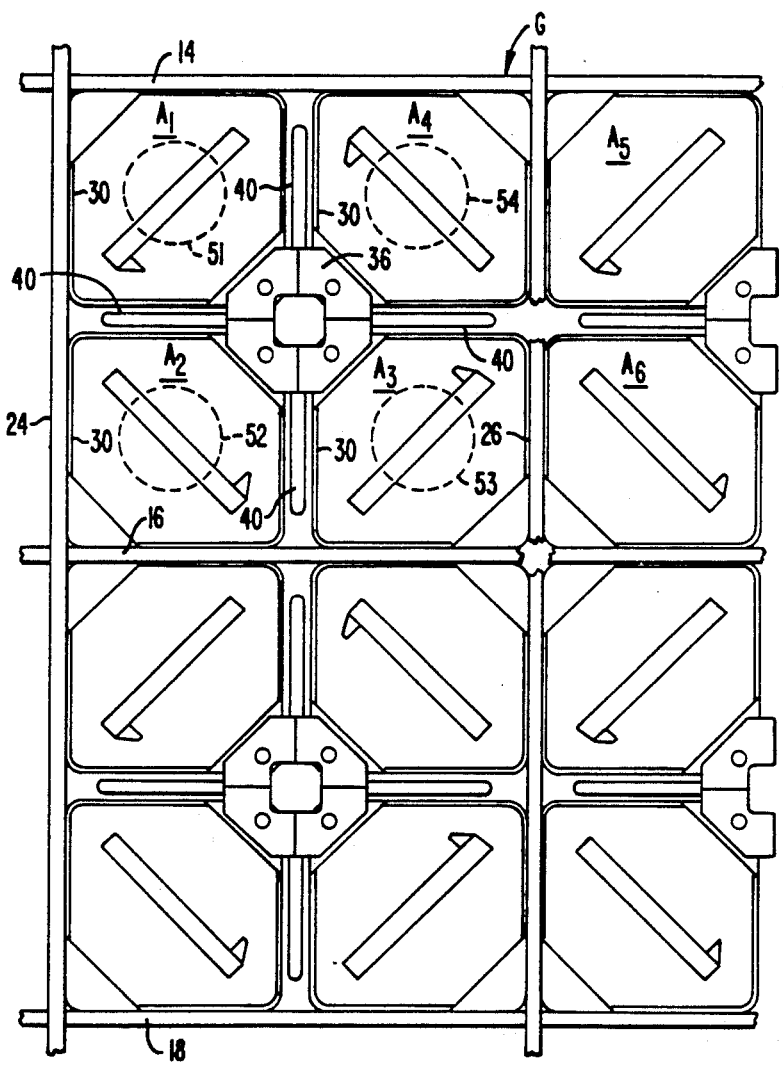
FIG._1. (PRIOR ART)

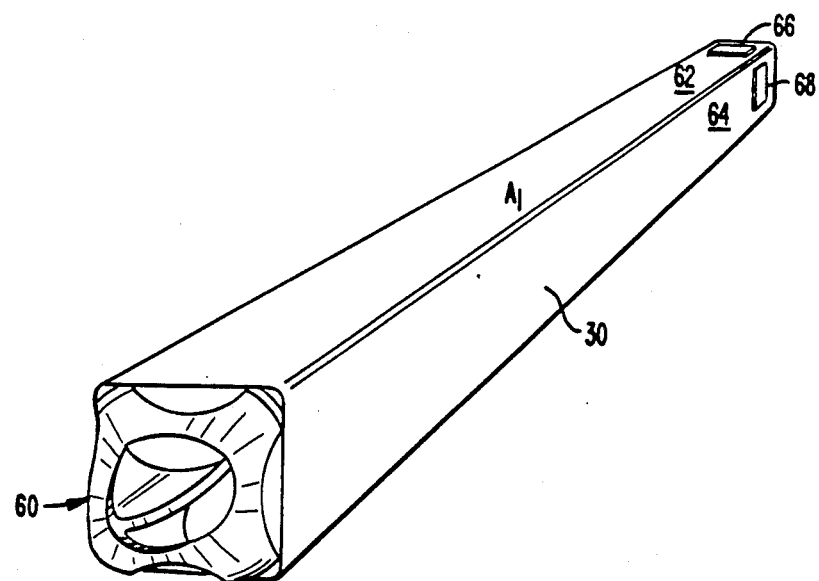
FIG._2.
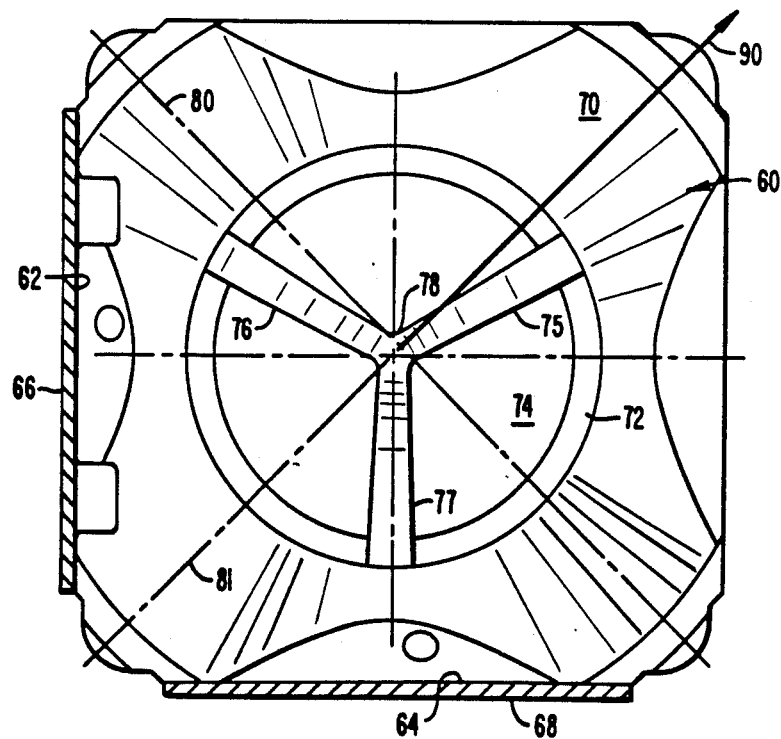
FIG._3.

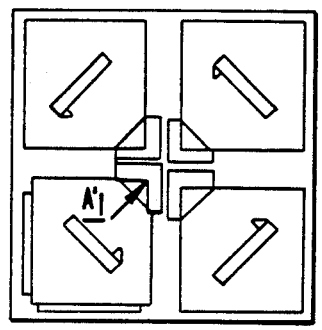
FIG._4A.
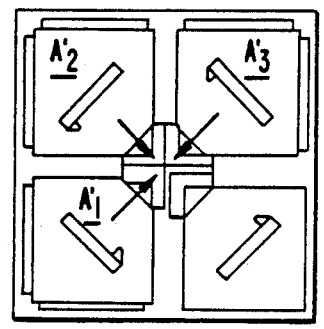
FIG._4C.
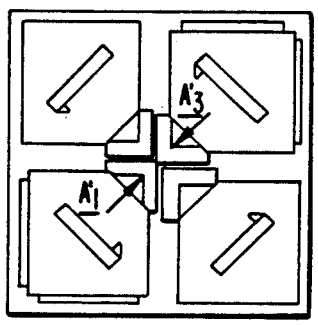
FIG._4B.
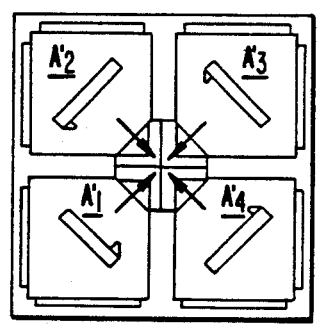
FIG._4D.

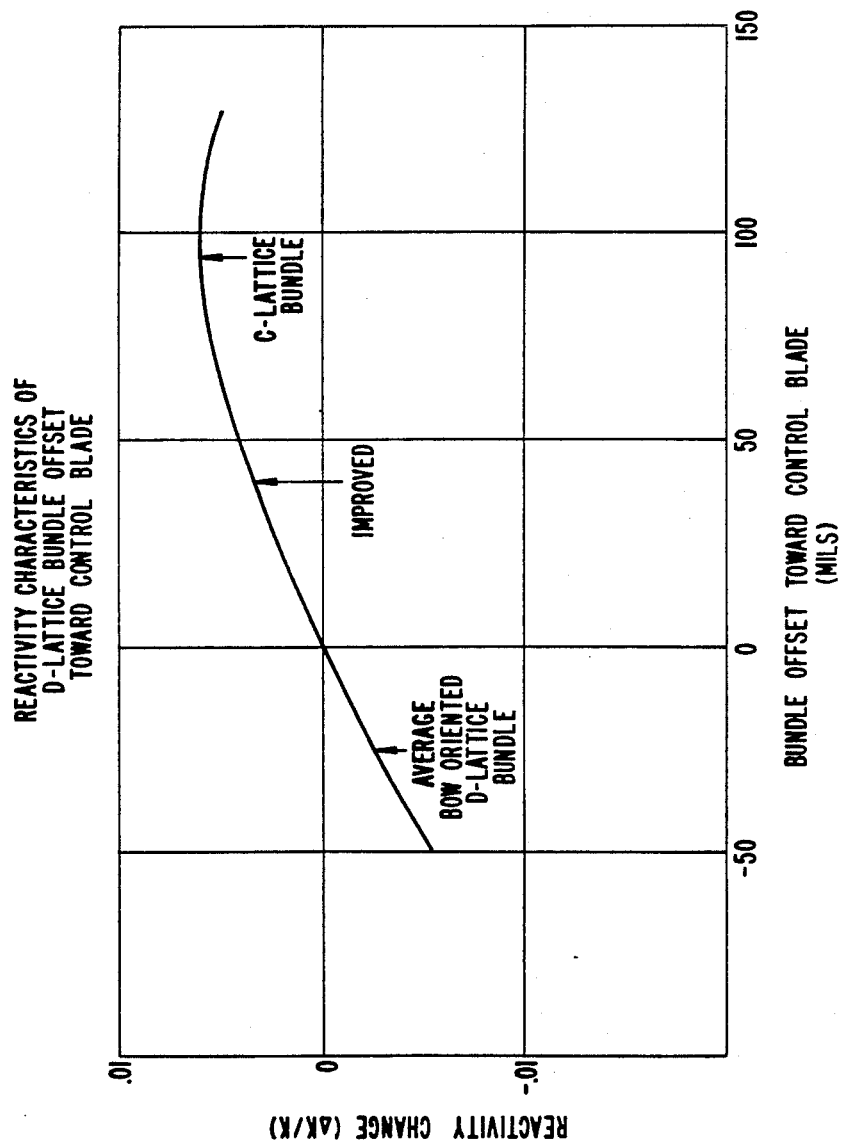

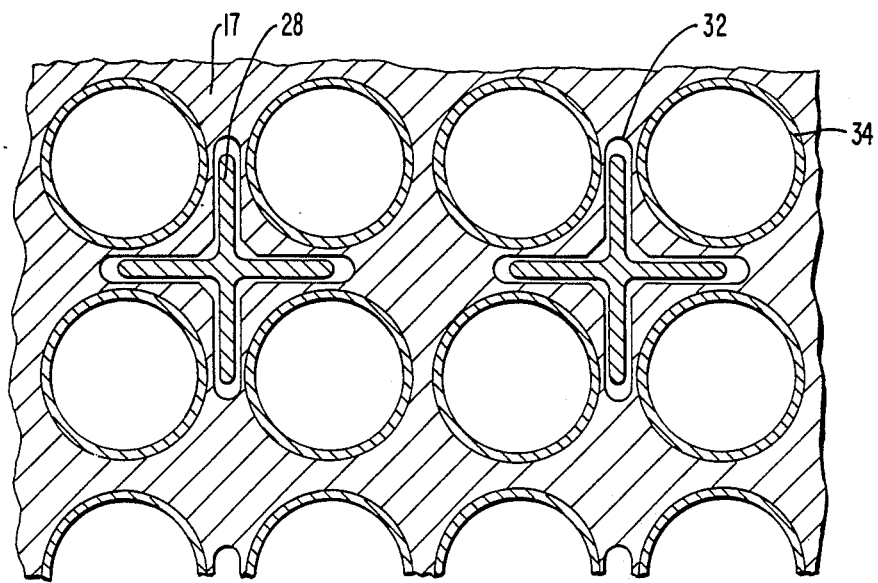
FIG._6.

REPOSITIONED FUEL ASSEMBLY

This invention relates to fuel channels for nuclear reactors. Specifically, a displaced fuel channel for a D-lattice reactor boiling water reactor (BWR) is disclosed to enable improved worth of the nuclear fuel assembly.

SUMMARY OF THE PRIOR ART

Boiling water reactors (BWRs) typically have their fissionable matter confined in discrete fuel rods. The rods are in turn confined in nuclear fuel assemblies. The nuclear fuel assemblies have a bottom inlet called a tie plate communicated to inflowing water through a bottom supporting core plate and core support casting. A polygon sectioned channel, which is preferably square sectioned, extends upwardly the full length of the nuclear fuel assembly.

These square sectioned nuclear fuel assemblies are typically placed in groups of four. Each group of four such assemblies has the assemblies spaced apart to define a cruciform shaped interstices between four adjacent nuclear fuel assemblies. It is into this cruciformed shaped interstices that a complementary cruciform shaped control rod penetrates to control the nuclear reaction.

Water to be boiled in a nuclear fuel assembly is typically communicated under pressure through an inlet in the core plate. The water passes from the core plate within the channel and around the individual fuel containing rods. In such passage, heat is removed from the fuel rods and the water is boiled. Utilizing the produced steam in a turbine generator, power can be produced.

In BWRs, two arrangements of groups of four nuclear fuel assemblies have been utilized. First, and oldest, is the so-called D-lattice fuel assembly array. In this type of array, the cruciform shaped interstices penetrated by control rods forms a larger dimension between fuel assemblies than those interstitial dimensions between fuel assemblies where the control rods do not penetrate. In such D-lattice type fuel assemblies, there has existed the problem of uneven peaking of the individual rods containing the nuclear fuel.

The peaking problem can be simply stated. Fission reactions of the type used in BWRs generate fast neutrons. Fission reactions, however, are initiated by slow neutrons. The water present in BWRs moderates or slows the generated fast neutrons to fission initiating slow neutrons.

Rods within the fuel channels in the nuclear fuel assemblies that are adjacent to large volumes of water typically are exposed to more slow neutrons and therefore have more fission reactions. These rods "peak" or have many fission reactions.

Rods within the fuel channel in the nuclear fuel assemblies that are adjacent to small volumes of water typically are exposed to less slow neutrons and therefore have less fission reactions. These rods do not "peak" and have fewer fission reactions.

The problem of "peaking" is alleviated by varying the enrichment profile of the individual rods across a nuclear fuel assembly. Typically, the rod enrichment profile is varied to ensure reasonable uniformity of reaction.

Unfortunately, as the rod enrichment profile varies, especially from being substantially uniform and symmetrical, the total energy output or "worth" of a nuclear fuel assembly declines. When worth declines, total power output declines and/or refueling must be more frequent.

Second, and more recently, is the so-called C-lattice fuel assembly array. In this type of array, the cruciform shaped interstices penetrated by the control rod has a width between nuclear fuel assemblies which is the same dimension as the width between nuclear fuel assemblies where the control rods do not penetrate. Such reactors are less subject to the "peaking" phenomena and make more efficient use of the enrichment of their fuel load.

In both the C-lattice and the D-lattice type reactors, great care has been and must be taken to avoid interference with the cruciform shaped interstitial volume between four adjacent nuclear fuel assemblies into which the control rod penetrates. Specifically, care is taken to prevent bowing of the fuel channels into the cruciform sectioned volume penetrated by the control rods. The reason for such precaution is clear; should the control rod not be able to penetrate the interstitial volume without significant friction, control rod is judged to be inoperable and fully inserted resulting in a loss of cycle energy.

It is known to place eccentrically mounted inlets or lower tie plates to fuel channels in D-lattice BWRs. Typically, such eccentrically mounted inlets have been for the purpose of mounting larger fuel assemblies in place of the originally designed and smaller assemblies. See U.S. Pat. No. 4,560,532 entitled Nuclear Fuel Assembly of Barry et al. issued U.S. Pat. No. 4,560,532. Unfortunately, mounting of such displaced and enlarged fuel channels can change the originally designed reactor flow rates and water volumes. These flow rates and water volume changes occur both interior of and exterior of the nuclear fuel assemblies. Such changes may possibly be tolerated if all nuclear fuel assemblies are all changed at once. However, substitution of some—but not all—of the nuclear fuel assemblies would cause flow rate changes departing significantly from original design.

Regarding the configuration of D-lattice reactors, these reactors have there top guides and core support castings—the castings that support the fuel assemblies on the core plate—specifically configured at the time of construction. Because of the original design, there is an industry wide "mind set" against core reconfiguration of any kind.

The mind set against core reconfiguration is well founded in operating experience. Specifically, reactors are typically operated for periods of up to 15 months without refueling. Thereafter, the reactor must be taken out for a refueling period, typically for a time period in the range of three months. These reactor refueling "outages" are incredibly expensive. When it is remembered that something in order of one third of the fuel assemblies are replaced during such an outage, having the reactor out for a sufficient period of time to reconfigure the core is unthinkable. This is especially true where the required outage could be three times as long as normal and only result in a relatively small improvement—in the order of 2%—of reactor efficiency.

This mind set against core reconfiguration is especially present when related to the cruciform shaped control rod interstices. Specifically, it has been the past practice to avoid encroaching on the volume defined between adjacent fuel channels for the control rod excursion. Further, the practice of "prebowing" of the channels has been followed to insure clearance of the control rods.

Regarding, the practice of "prebowing", the fuel channels—fabricated from an alloy known under the name zircalloy—are observed for any ambient bowing at the time of their installation. This bowing-or deviation from the true vertical-is then used in the placement of fabricated fuel assemblies using the channels. Specifically, the channels are aligned so as to bow away form the cruciform interstices to thereby ensure control rod clearance.

Thus, the issue is not one of safety, but rather a penalty in overall reactor energy. Should the control rod not be able to penetrate the interstitial volume without significant friction, the control rod is judged to be inoperable and is thus fully inserted resulting in a loss of cycle energy.

Typically, control rods are periodically exercised. In such exercise, they are inserted by drives under relatively great force until the control rods reach a desired position of controlling penetration into the cruciform shaped interstices. Upon reaching there required position of penetration, the rods are allowed to settle under the force of gravity into a mechanical stop. If for some reason—such as failure to maintain the required clearance between the fuel assemblies—the control rods do not settle they are "declared inoperative." Upon such a declaration, the control rods must be inserted fully. This insertion occurs under great power from the control rod drives. Consequently, it is virtually unknown that the control rod insertion does not occur. Until there is a refueling and the control rods can be repaired, the fully inserted control rod constitutes an energy penalty which is required for the reactor. Naturally, prudent operation requires the avoidance of such an energy penalty.

DISCOVERY

We have discovered that with respect to the refueling of D-lattice nuclear reactors that shimming of the individual fuel assemblies to and toward the enlarged cruciform sectioned interstitial volume used for the control rod excursion produces unexpected extensions in possible enrichments of the nuclear fuel assemblies. This discovery is supplemented by the disclosed fuel design. It has been found that 57 mil shifts of each nuclear fuel assembly diagonally toward the cruciform sectioned control rod volumes enables enrichment producing as much as 2.0% prolongation of life in a fuel assembly. Aggregated over the entirety of a typical D-lattice reactor having 764 discrete nuclear fuel assemblies, substantial savings result. By way of example, assuming a change of 1.5% in enrichment, a 2% prolongation of life in a fuel assembly is about $4,000.00 savings for the particular fuel assembly. The fuel assembly savings when aggregated over an entire reactor can including savings of up to $3,000,000.00 for complete refueling of a reactor using the displaced channel of this invention.

We have additionally discovered that by moving the fuel assemblies towards one another and effectively encroaching upon the tolerance heretofore used for the control rods, that the problem of fuel channel bowing is decreased. Specifically, the nonuniformities of fast neutron flux are reduced on the fuel channels. It is known that fast neutron flux across a fuel channel causes metallurgical elongation of the channel. We have identified that by moving the fuel assemblies closer together, that the fast flux gradients across the channels are reduced.

When the fast flux gradients are reduced, the tendency of the channel to bow—that is to grow under neutron bombardment more on one side than on the other—is likewise reduced. Therefore, the displaced fuel assembly disclosed has the rather surprising tendency to reduce fuel assembly bowing.

It will be understood that control rod bowing is auto catalytic. The more that channels bow, the greater the gradient across the bowed channel. The greater the gradient, the faster bowing will occur. Therefore, it will be understood that the minimization of initial bowing is critical.

It will be understood that the discovery of a solution can constitute invention as much as the specific design which implements that solution. Consequently, invention is claimed in the discovery herein set forth.

SUMMARY OF THE INVENTION

In a boiling water reactor (BWR) of the D-lattice type, an improved apparatus and method for the mounting of a nuclear fuel assembly is disclosed. Specifically, a D-lattice nuclear fuel assembly is diagonally displaced at the top and diagonally displaced at the bottom to and toward the cruciform shaped control rod interstices. Displacement at the bottom end of the nuclear fuel assembly occurs by an eccentrically centered lower tie plate and fluid inlet for fitting to the core plate at the bottom end of the assembly. Displacement at the top end of the nuclear fuel assembly occurs by shims in the vicinity of the upper end of the channel at the top guides and an altered channel clip. The disclosed channel assembly is capable of installation during refueling cycles, with a displaced channel being substituted for prior art conventional D-lattice channels. Substitution of one or more displaced channel occurs with each refueling cycle in a group of four channels. Consequently, there results at the end a maximum of four refueling cycles, complete installation of the displaced channels. As substitution occurs, there results an improved worth of each fuel channel assembly enabling an eventual aggregate 2.0% increase in life with resultant savings.

OTHER OBJECTS AND ADVANTAGES

An object of this invention is to disclose a modification of fuel assembly spacing in a nuclear reactor without overall reactor modification. Accordingly, a modified nuclear fuel assembly is disclosed which when placed in a D-lattice reactor modifies that reactor to and toward a C-lattice configuration. According to this aspect of the invention, the fuel channel on those two sides adjacent the top guide is provided with shims. These shims, on the order of 40 mils thick, are mounted on two channel side walls towards one outside corner of the nuclear fuel channel. A channel clip and spacer button having reduced dimension spaces the fuel assemblies one from another to define the required cruciform shaped control rod interstitial volume. An offset tie plate inlet fitting is mounted at the bottom of a nuclear fuel channel. This offset tie plate inlet fitting is offset to and towards the same corner of the nuclear fuel assembly having the shims. There results a nuclear fuel assembly which when placed on the core support casting at the offset tie plate inlet fitting and held at the top guide by the installed shims is biased to and towards the control rod cruciform shaped interstices.

A primary advantage of this invention is that it constitutes a piece meal reconfiguration of the reactor core that occurs upon refueling. No gross alterations of the core are required. For example, reactor components such as the top guide and core support castings are not changed or modified.

An advantage of the disclosed nuclear fuel channel assembly is that it is not an enlargement or modification of the originally designed D-lattice nuclear fuel channel assemblies. It only constitutes a displacement of the assemblies originally designed for the D-lattice nuclear reactor. Consequently, the necessary equilibrium of fluid flows and volumes within the nuclear fuel channel and fluid flows and volumes exterior to the nuclear fuel channel are maintained.

A further advantage of this invention is to disclose its use with respect to refueling and refueling cycles. According to this aspect of the invention, nuclear fuel channel assemblies having the displacement apparatus herein disclosed are inserted one at a time during each fuel "cycle". In such a fuel cycle, it is common to replace either one out of four or two out of four nuclear fuel channel assemblies, these assemblies being clustered around a control rod. The refueling cycles, typically occurring on a eighteen month time intervals, enable the sequential placement of the modified nuclear fuel channels with their fuel saving displacement.

An additional and serendipitous advantage is that by encroaching on the originally required control rod tolerance, the problem associated with fuel channel bowing is reduced. Consequently, further fuel inefficiencies due to channel bowing are reduced.

BRIEF DESCRIPTION OF THE DRAWINGS

Other objects, features and advantages of this invention will be more apparent after referring to the following specification and attached drawings in which:

FIG. 1 is a schematic plan of a prior art D-lattice type nuclear reactor illustrating two complete groups of four adjacent nuclear fuel assemblies, each group of four defining a cruciform sectioned interstitial volume with a control rod shown in a position of partial penetration for moderating the reaction within the fuel assemblies;

FIG. 2 is a perspective view of the improved fuel channel assembly according to this invention illustrating upper shims in the vicinity of the top guide for displacing the channel top diagonally to and toward the cruciform sectioned interstitial volume utilized by the control rod and an eccentric inlet tie plate for displacing the channel bottom diagonally to and toward the cruciformed sectioned interstitial volume used by the control rod;

FIG. 3 is a section along lines 3—3 of FIG. 2 illustrating the eccentric construction of the tie plate inlet fitting for offsetting the bottom of fuel channel assembly at the core plate to and toward the interstitial cruciform sectioned control rod volume;

FIGS. 4A-4D are a cartoon series illustrating the sequential insertions of the improved fuel channels of this invention to realize increased worth from the offset nuclear fuel channels;

FIG. 5 is a graphic representation of the improved worth resulting from the improved enrichment tolerable by the offset nuclear fuel assemblies of this invention and, FIG. 6 is a schematic of the lower tie plate supports.

Referring to FIG. 1, a plan view of a reactor is illustrated in the vicinity of a top guide G. The illustration herein shows only a small fraction of the top guide of a reactor showing some 12 odd fuel assemblies.

Top guide G is horizontally disposed. Extending parallel in one direction it includes plates 14, 16 and 18. These plates each extend into the plane of the drawing and form the upper side braces for the fuel assemblies.

Parallel plates 14, 16, and 18 are orthogonally intersected by parallel plates 24, 26. Other parallel plates are not shown, it being understood that only a small portion of reactor at the top guide is illustrated. These plates also extend into the plane of the drawing and form the upper side braces for the fuel assemblies. The plates 14, 16, 18 and 24, 26 are typically orthogonally intersected with confronting grooves so as to form an overall grate or "egg crate" structure.

Referring locally to the square grate structure defined by plates 14, 24, 16, and 26, a typical D-lattice fuel assembly can be understood. It will be remembered that the illustrated structure is located at the upper end of the fuel channel assemblies.

Interior of plates 14, 24, 16, 26 are located the upper end of four fuel assemblies A1, A2, A3, and A4. These assemblies each include a surrounding channel 30 and have in them an array of vertically extending tubular claddings. These tubular claddings are plugged at both ends and trap the fissionable material with the tubular claddings.

Each fuel assembly A1-A4 includes respective fuel channels 30. Respective channels 30 as bounded on the outside by lattice members 14, 24, 16, and 26, are clipped together on the upper inside adjacent corners at conventional channel clips 36. The channel clips 36 are spring biased and serve to hold the channels 30 of the nuclear fuel assemblies in the required D-lattice spaced apart relationship. The required cruciform shaped interstices for the control side 40 is maintained.

The nuclear reaction must be controlled. Therefore, control rods 40, typically of cruciform shape, are inserted into and out of the reactor to provide the desired control.

It can be seen that adjacent fuel assemblies A3 and A4 are fuel assemblies A5 and A6. It is the difference in spatial separation between fuel assemblies A3 and A4 on one hand and A3 and A6 on the other hand that gives the so-called "D-lattice" nuclear reactor core its particular geometry characteristic.

In order to provide ample room (actual dimension plus tolerance) for control rod 40 to enter into the interstices between adjacent fuel assemblies A1, A2, A3, and A4, a relatively wide gap was originally designed between the respective fuel channels 30. This gap is conventionally 0.750 inches.

However, where a bar 14, 16, 18, 24, 26, etc. is present between two adjacent fuel assemblies (as in the case of fuel assemblies A3, A6) such a large gap is not needed. Rather, the gap is narrowed. This gap is conventionally 0.374 inches.

Thus, the configuration of the illustrated typical D-lattice core cells and their contained fuel assemblies results. There are wide gaps where the control rods are present and narrow gaps where the control rods are not present.

The reader will understand that approximately 12 feet below the top guide there resides a core plate 17 having a core supporting casting. Core plate 17 constitutes the support structure for the bottom end of the fuel assemblies A. As D-lattice nuclear reactors were designed, the core plate was perforated with a single hole penetrated by the control rod, providing for support of the core support casting, and allowing water inflow through the core support casting to the control rod bottom tie plate inlet fitting. With brief reference to FIG. 6 the schematic of a lower core plate 17 can be easily understood. The core plate includes a number of circular fittings 34. These fittings can be mounted directly on the core support plate 4 and take the form of castings.

The circular fittings 34 are the apertures to which the lower tie plate is confronted. Specifically by placement at cylinderical protusion 72 of the lower tie-plate, both centering and support of the fuel assembly occurs. Provision is made for the penetration of the control rod 28 into and out of interstices between adjacent fuel assemblies at cruciform shaped opening 32.

The lower fuel assembly tie plate provides three functions. First, the tie plate supports the weight of the fuel assemblies A1–A4. Secondly, the interior of the apertures 51–54 allows water to be introduced interiorly of each of the fuel assemblies A1–A4. Steam is thus generated. Thirdly, a small hole in the lower tie plate allows for water flow interstitially of the nuclear fuel assemblies. This water flow is important to properly moderate the nuclear reaction exterior of the adjacent fuel assemblies.

The reader will appreciate that interior structures of such reactors are extremely difficult to modify. Besides being radioactive, the locations of the constituent support the surfaces and their weight makes their alteration not practical. Consequently, replacement of the core plate, core support castings, and top guide is not practicable for the efficiency change realized herein.

At the same time the fuel assemblies A1–A4 are frequently substituted as part of the refueling process. Specifically, and by way of example, such substitution can occur at three month refueling "cycles" with intervening 18 month period of operation. Four such refueling "cycles" can typically include substituting fuel assembly A1 first, substituting fuel assembly A3 second, substituting fuel assembly A2 third, and finally substituting fuel assembly A4 fourth. Thus at the end of a two year recycle period all of the fuel assemblies will have been changed.

Having set forth this requisite background, the invention may now be set forth.

First, the fuel channel end will be discussed with reference to FIG. 2. Thereafter, and with respect to FIG. 3, the tie plate which fits within the apertures 51–54 will be set forth. It will be shown that these channels and tie plates displace the fuel assemblies to and towards the control rods.

Secondly, and with respect to FIG. 4A–4C, the step substitution of the modified nuclear assemblies for the older assemblies will be illustrated. It will be shown that use of the invention can fit easily into conventional fuel cycle refueling.

Referring to FIG. 2, a nuclear fuel assembly A1 is illustrated. This nuclear fuel assembly has a lower inlet tie plate 60 (more particularly described with respect to FIG. 3) and a rectangular section fuel channel 30. The nuclear fuel assembly is shown lying on its side.

At walls 62, 64 of the channel 30 at the upper end of the channel are placed shims 66, 68. These respective shims 66, 68 are even with the BWR top guide G and cause the upper end of the fuel assembly A1 to be displaced diagonally away from wall 62, 64. Preferably, the shims are tapered at their lower end to prevent mechanical interference with the top guide G during lowering insertion through the top guide G and onto the core plate.

Typically the shims are from 20 mils to 100 mils thick. We prefer 40 mils.

Referring back to FIG. 1, it will be understood that shims 66, 68 register to top guide G. It will be understood that the fuel channel assembly will move diagonally to and towards the respective control rods 40 at the top portion.

At the same time, it can be seen that inlet tie plate 60 is of eccentric construction. This can best be set forth with respect to FIG. 3.

Turning to FIG. 3, inlet tie plate 60 includes a conical surface 70 with a short cylindrical protrusion 72. Cylindrical protrusion 72 is open as at 74 and provided with three symmetrical bridge members 75, 76, 77 all joining at 78.

Using diagonal center lines 80 and 81, the eccentric construction of nose piece 60 can be understood. Specifically, cylindrical protrusion 72 is eccentric. It is eccentric with respect to the intersections of center lines 80, 81. Specifically, a displacement of the center of the inlet tie plate 60 has occurred along center line 81 to and towards channel walls 62, 64.

The eccentric construction illustrated will admit of a number of embodiments. For example, the entire casting can be eccentrically cast as illustrated in FIG. 3. Alternately the casting can be concentrically cast an eccentrically machined.

The plan view of FIG. 3 looks immediately down the respective channel walls. Consequently, the respective shims 66, 68 can be seen at the far end of the fuel assembly. The reader will remember that shims 66, 68 will ultimately bear against top guide G to effect displacement.

Having set forth the construction of both the inlet tie plate 60 and the shims 66, 68, displacement can be readily understood. Specifically, inlet tie plate 60 will displace the fuel channel at the bottom in the direction of arrow 90. Similarly shims 66 and 68 will displace the upper ends of the fuel assemblies in the direction of arrow 90. Consequently, even, vertical and diagonal displacement of the nuclear fuel channel assembly to and toward the cruciform shaped control rod interstices will occur.

Understanding that the improved fuel assembly A1 illustrated in FIG. 2 is the improved article of this invention, attention can now be directed to the cartoon series of FIGS. 4A, 4B, 4C and 4D.

Referring to FIG. 4A, a cluster of four fuel assembles is illustrated. This cluster is then identical to the fuel assemblies A1, A2, A3 and A4. This identity has one exception. Specifically in FIG. 4A and at the end of a first fuel recycling, the improved nuclear fuel assembly A1' of this invention has been substituted for nuclear fuel assembly A1. This leaves three prior art fuel assemblies and the first modified fuel assembly of this invention installed within a reactor in the group of four.

Referring to FIG. 4B, two improved fuel assemblies A1', A3' are illustrated installed. These fuel assemblies are typically installed diagonally opposite one another during a refueling cycle. In the view of FIG. 4B, two conventional fuel assemblies A2 and A4 remain.

Referring to FIG. 4C, a third fuel assembly A2' has been substituted for fuel assembly A2.

Finally, referring to FIG. 4D, complete substitution has occurred with nuclear fuel assemblies A1'-A4' residing in the group of four.

The substitution of the cartoon series of FIGS. 4A–4D usually occurs over four so-called refueling "cycles" and may take as long as six years to result.

It is important to note that the total water flow cross sectional area inside the respective fuel assemblies and the total water flow cross sectional area exterior of the fuel assemblies remains unchanged in FIGS. 4A, 4B, 4C, and 4D. This enables operation of the reactor at identical water volumes and flow rates during the four fuel cycles resulting in complete channel replacement.

The reader will understand that in this particular innovation, dimensions are important. Specifically, 0.750 inches is the original clearance designed into a D-lattice reactor between adjacent fuel assemblies at the cruciform shaped control rod interstices. Into this dimension, a control rod having a 0.312 inch width makes excursion. Considering the case of one fuel assembly, a clearance of 0.375 inches (one half of the total fuel assembly to fuel assembly clearance) has a 0.156 inch control rod blade (one half of the blade) leaving a theoretical free space of 0.119 inches between the fuel assembly and an exactly centered control blade.

This disclosure operates by displacing the fuel assembly to and toward this space by 0.040 inches. This leaves a free space of 0.079 inches (0.119–0.040).

After the substitution of the displaced fuel assembly of this invention, the gap between two adjacent fuel assemblies across the control rod will be 0.670 inches (from the original 0.750 inches). The gap between two adjacent fuel assemblies having no control rod between them will be 0.474 inches (increasing from the original 0.374 inches).

If the dimensions of a D-lattice reactor were to be lessened by 0.094 inches—the D-lattice reactor would become a C-lattice reactor. It will be realized by having the displacement in the range of 0.040 inches, the preferred embodiment illustrated herein, an efficiency close to the C-lattice reactor can be realized.

The reader will realize that much of the efficiency herein set forth could be realized by the displacement of as few as two of the four channels held within an original cell. For example, if two channels where displaced—each by 0.080 inches—the resulting clearance between the adjacent fuel assemblies would be the same. We prefer to displace all channels evenly so that the centering of the control rod remains.

The results set forth in this invention could well be achieved by displacing one fuel assembly as much as 0.100 inches. This would be the outside limit of fuel assembly displacement that would be acceptable.

Realizing that each fuel assembly is displaced 0.040 inches towards the control rod cruciform shaped interstitial volume, the reader will realize that the diagonal displacement is 0.056 inches with the substitution of the displaced channel.

As previously emphasized, it has been found that the displacement of the nuclear fuel assemblies towards one another has a serendipitous result. Specifically, the problem of channel bowing is reduced. This reduction of bowing occurs because the fast flux gradient—that is the density gradient of the fast neutrons—is reduced.

Thus the tendency of a badly bowed channel to generate additional neutron inefficiencies are likewise reduced.

Referring to FIG. 5, a graphic representation of the improved overall worth appears. Specifically, and when complete nuclear fuel channel substitution occurs, reactivity change can be seen as rapidly approaching the performance of a C-lattice reactor.

What is claimed is:

1. In a nuclear reactor having a core with discrete replaceable identical fuel assemblies, said fuel assemblies being supported on a lower core plate and held in vertically upstanding relation at an upper top guide, each fuel assembly including, a lower tie plate for support from said core plate, an upper tie plate, a plurality of fuel rods between said upper and lower tie plates, and a square section fuel channel surrounding said lower tie plate, said fuel rods and said upper tie plate;

a first group of four of said fuel assemblies mounted adjacent one another with said fuel assemblies spring biased away one from another to define at their juxtaposed channels first spatial intervals together having a cruciform shaped interstice between said channels;

a complementary cruciform shaped control rod, said control rod for excursion into and out of said cruciformed shaped interstitial volume defined by said first spatial intervals between said four fuel assemblies;

a second group of fuel assemblies immediately surrounding said first four fuel assemblies, said second group fuel assemblies further defining second spatial intervals around said first group of fuel assemblies, said second spatial interval being less than said first spatial intervals; said second spatial interval having no control rod for penetration into and out of said second spatial intervals;

an improved fuel assembly for refueling replacement with said first group of fuel assemblies, said improved fuel assembling being identical to said fuel assemblies in said first group and additionally including at least first and second nonresilient plate means on the outside of said nuclear fuel assembly adjacent said top guide for contact therewith for displacing said assemblies against said spring bias to and towards said control rod cruciformed section interstitial volume; and, a lower tie plate having an eccentric mounting for displacing the lower portion of said fuel assembly to and toward said control rod cruciformed section interstitial volume whereby the top and bottom of said fuel assembly is displaced towards said cruciformed section control rod interstitial volume without otherwise altering said reactor.

2. The improved fuel channel of claim 1 and wherein the displacement of said fuel channel does not exceed 0.100 inches.

3. The improved fuel channel of claim 1 and wherein the displacement of said fuel channel is 0.040 inches.

* * * * *